United States Patent
Takatsuna

(10) Patent No.: US 12,056,481 B2
(45) Date of Patent: *Aug. 6, 2024

(54) SOFTWARE UPDATE DEVICE, UPDATE CONTROL METHOD, AND NON-TRANSITORY STORAGE MEDIUM

(71) Applicant: TOYOTA JIDOSHA KABUSHIKI KAISHA, Toyota (JP)

(72) Inventor: Yusuke Takatsuna, Ama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,946

(22) Filed: Jul. 14, 2023

(65) Prior Publication Data

US 2023/0359454 A1 Nov. 9, 2023

Related U.S. Application Data

(63) Continuation of application No. 17/369,460, filed on Jul. 7, 2021, now Pat. No. 11,755,308.

(30) Foreign Application Priority Data

Aug. 25, 2020 (JP) ................................. 2020-142008

(51) Int. Cl.
| | |
|---|---|
| G06F 8/65 | (2018.01) |
| B60W 50/06 | (2006.01) |
| H04L 67/00 | (2022.01) |

(52) U.S. Cl.
CPC ............... *G06F 8/65* (2013.01); *B60W 50/06* (2013.01); *H04L 67/34* (2013.01); *B60W 2556/45* (2020.02)

(58) Field of Classification Search
CPC ..... B60W 50/06; B60W 2556/45; G06F 8/65; H04L 67/34; H04L 29/08
See application file for complete search history.

(56) References Cited

U.S. PATENT DOCUMENTS

| | | | |
|---|---|---|---|
| 9,983,866 | B1 | 5/2018 | Panchanathan et al. |
| 10,007,504 | B2 | 6/2018 | Blaschke et al. |

(Continued)

FOREIGN PATENT DOCUMENTS

| | | |
|---|---|---|
| JP | 2001-229014 A | 8/2001 |
| JP | 2004-005152 A | 1/2004 |
| JP | 2004-326689 A | 11/2004 |

OTHER PUBLICATIONS

Jul. 20, 2022 Office Action issued in U.S. Appl. No. 17/369,460.

(Continued)

*Primary Examiner* — Geoffrey R St Leger
*Assistant Examiner* — Cheneca Smith
(74) *Attorney, Agent, or Firm* — Oliff PLC

(57) ABSTRACT

A software update device is configured to control software update of an electronic control unit mounted on a vehicle. The software update device includes: one or more storage devices configured to store first software and second software for downloading update data of the electronic control unit from a server, the first software and the second software being different from each other; and one or more processors configured to download the update data from the server by executing any of the first software and the second software.

4 Claims, 11 Drawing Sheets

(56) References Cited

U.S. PATENT DOCUMENTS

| | | |
|---|---|---|
| 2005/0273781 A1 | 12/2005 | Nakamura et al. |
| 2014/0136826 A1* | 5/2014 | Paek .................. G06F 8/65 |
| | | 713/1 |
| 2017/0034309 A1* | 2/2017 | Duan .................. G06F 8/65 |
| 2018/0088963 A1* | 3/2018 | Arora ............... G06F 9/4406 |
| 2019/0102159 A1 | 4/2019 | Gur et al. |
| 2019/0268420 A1 | 8/2019 | Acharya et al. |
| 2019/0278581 A1 | 9/2019 | Miller et al. |
| 2020/0114927 A1* | 4/2020 | Yokota .................. G06F 8/65 |

OTHER PUBLICATIONS

Jan. 20, 2023 Office Action issued in U.S. Appl. No. 17/369,460.
Apr. 26, 2023 Notice of Allowance Issued in U.S. Appl. No. 17/369,460.

* cited by examiner

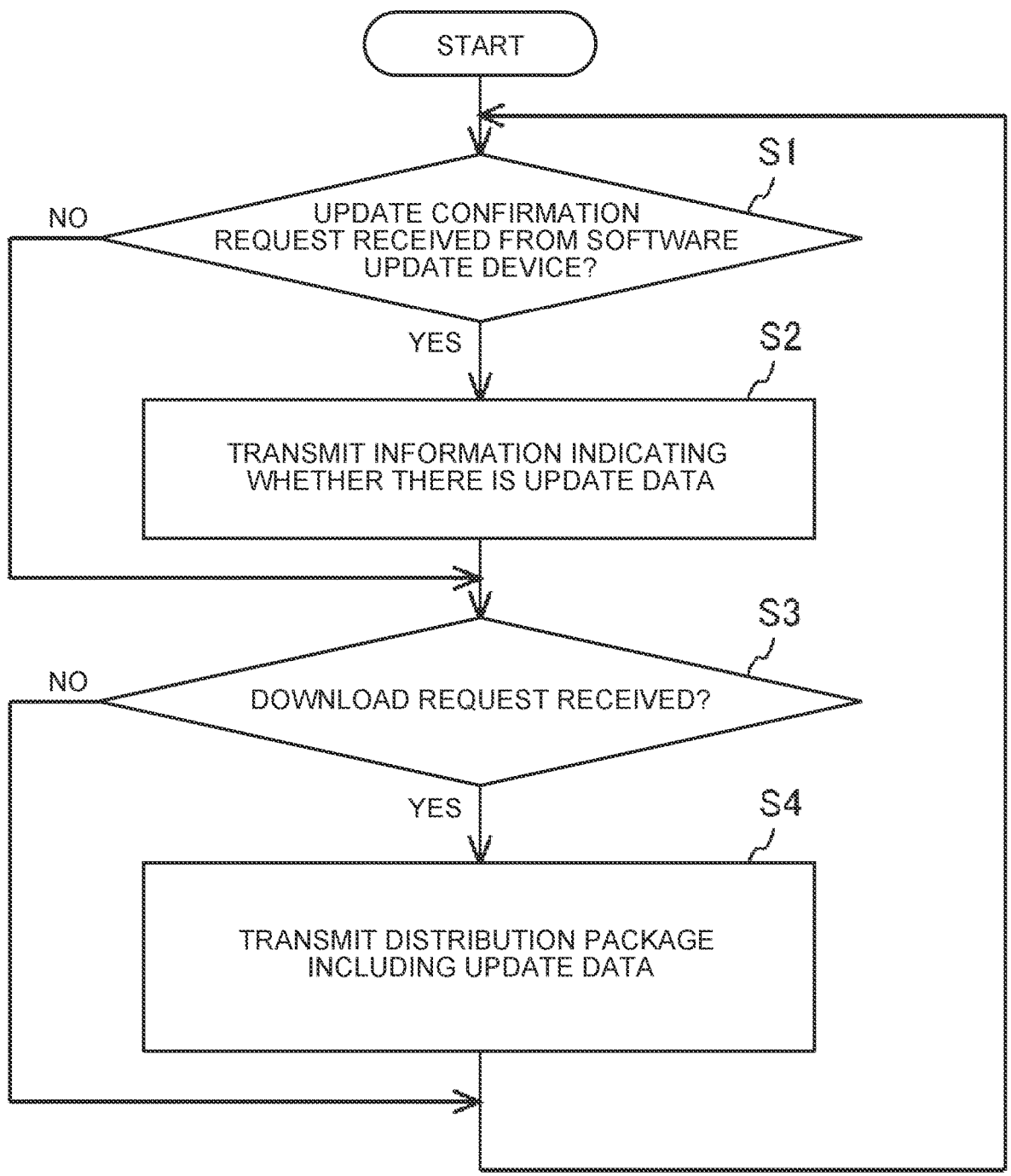

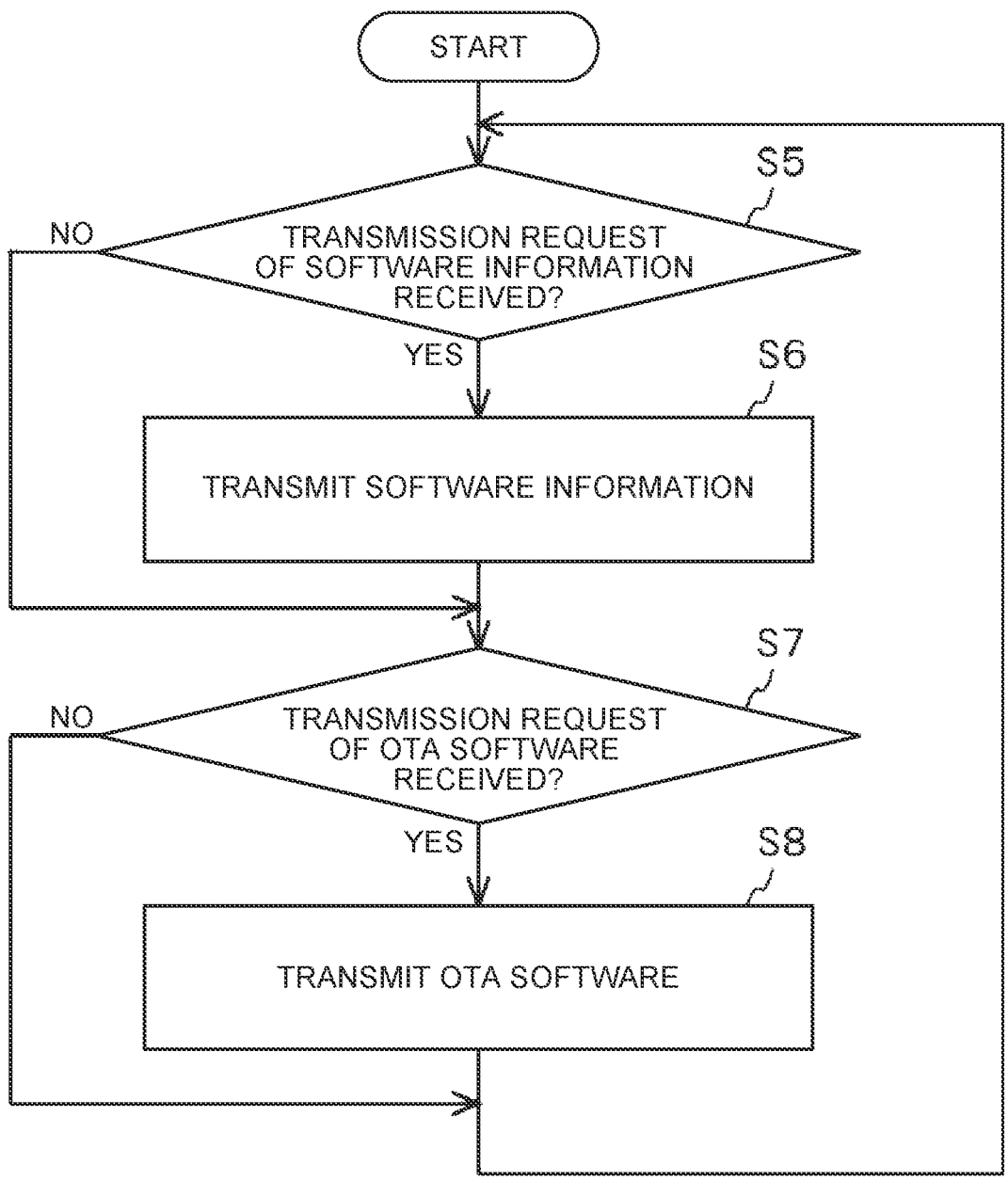

SOFTWARE UPDATE DEVICE, UPDATE CONTROL METHOD, AND NON-TRANSITORY STORAGE MEDIUM

CROSS-REFERENCE TO A RELATED APPLICATION

This application is a continuation of U.S. patent application Ser. No. 17/369,460, filed on Jul. 7, 2021, now U.S. Pat. No. 11,755,308, issued Sep. 12, 2023, which claims priority to Japanese Patent Application No. 2020-142008, filed on Aug. 25, 2020, the entire disclosures of each of which are incorporated herein by reference in their entirety.

BACKGROUND

1. Technical Field

The present disclosure relates to a software update device, an update control method, and a non-transitory storage medium.

2. Description of Related Art

A vehicle is equipped with a plurality of electronic control units (ECUs) that controls an operation of a vehicle. The ECU includes a processor, a transitory storage unit such as a random access memory (RAM), and a non-volatile storage unit such as a flash read-only memory (ROM). The processor executes software stored in the non-volatile storage unit to realize the control function of the ECU. The software stored in each ECU is rewritable, and by updating the software to a newer version, it is possible to improve the function of each ECU or add a new vehicle control function.

An example for a technology for updating the software of the ECU is an over-the-air (OTA) technology, in which an in-vehicle communication device connected to an in-vehicle network is wirelessly connected to a communication network such as the Internet, the software is downloaded from the server via wireless communication, and the downloaded software is installed, thereby updating or adding program of the ECU (for example, refer to Japanese Unexamined Patent Application Publication No. 2004-326689 (JP 2004-326689 A)).

A software distribution function is implemented with a server provided in a center in a manner such that OTA software is installed. On the other hand, the software update device mounted on the vehicle uses client software corresponding to the OTA software executed by the server to request the server to confirm update data and download the update data.

SUMMARY

The OTA software used on the server may be changed during a period in which the vehicle is used. When the OTA software used on the server is changed and vendors that provide the OTA software differ between the server and the vehicle, the software cannot be updated via OTA without software compatibility between the vendors.

The present disclosure provides a software update device, an update control method, and a non-transitory storage medium that can update software via OTA even when the OTA software on the server is changed.

A software update device according to a first aspect of the present disclosure is configured to control software update of an electronic control unit mounted on a vehicle. The software update device includes: one or more storage devices configured to store first software and second software for downloading update data of the electronic control unit from a server, the first software and the second software being different from each other; and one or more processors configured to download the update data from the server by executing any of the first software and the second software.

An update control method according to a second aspect of the present disclosure is a method executed by a computer including a processor, a memory, and a storage device so as to control software update of an electronic control unit mounted on a vehicle. The update control method includes: storing first software and second software for downloading update data of the electronic control unit from a server: and downloading the update data from the server by executing the first software or the second software. The first software and the second software are different from each other.

A non-transitory storage medium according to a third aspect of the present disclosure stores an update control program that is executable by a computer and that causes the computer to perform functions so as to control software update of an electronic control unit mounted on a vehicle. The computer includes a processor, a memory, and the non-transitory storage medium. The functions include: storing first software and second software for downloading update data of the electronic control unit from a server; downloading the update data from the server by executing the first software or the second software. The first software and the second software are different from each other.

According to the present disclosure, it is possible to provide the update device, the update control method, and the non-transitory storage medium that can update software via the OTA even when OTA software on the server is changed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a flowchart showing an example of a control process executed by the server according to the first embodiment;

FIG. 13 is a flowchart showing an example of a control process executed by the server according to the second embodiment.

DETAILED DESCRIPTION OF EMBODIMENTS

Structure Common to First and Second Embodiments

Figure 1:
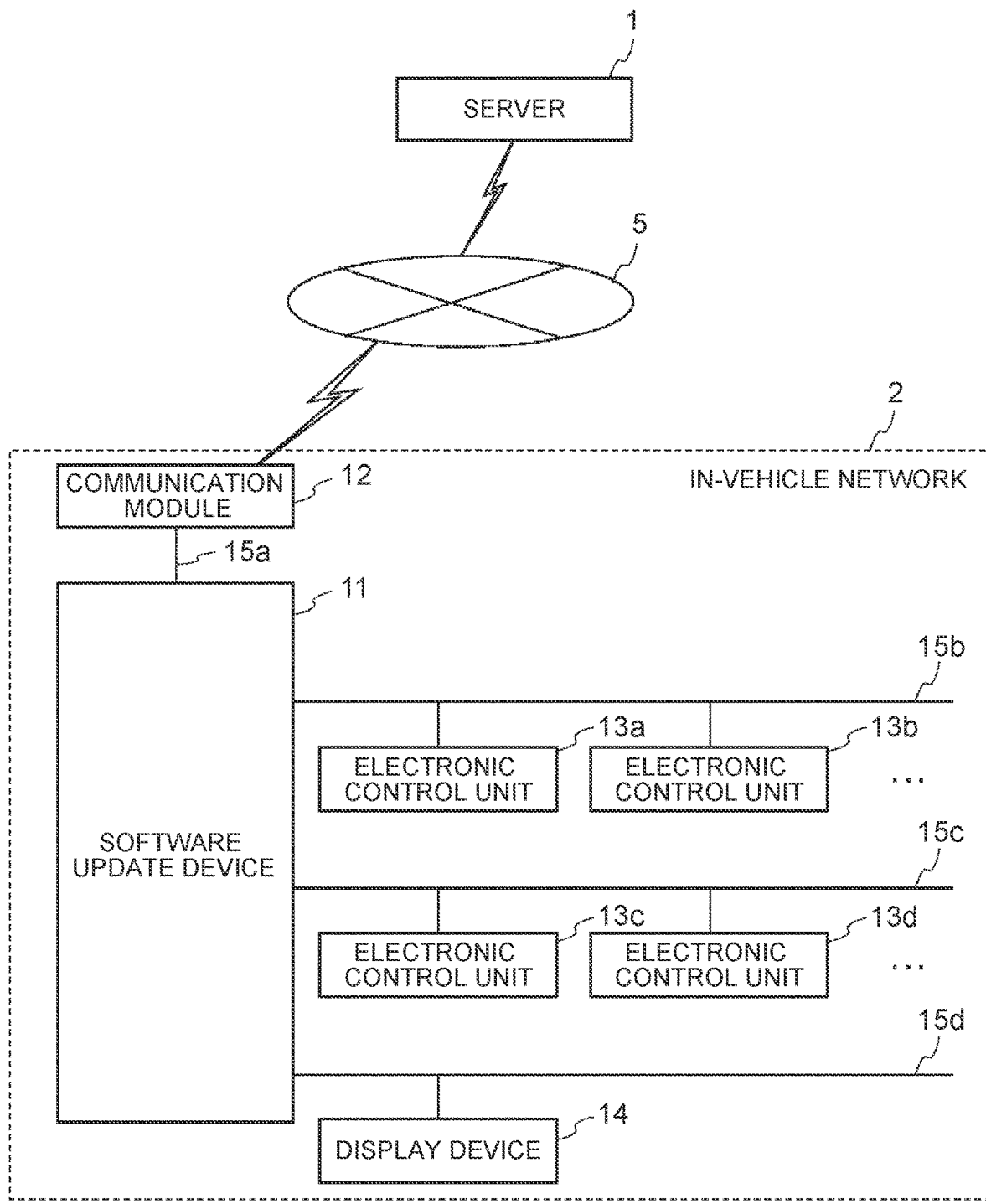
FIG. 1 is a block diagram showing an overall configuration of a network system according to embodiments.
Figure 2:
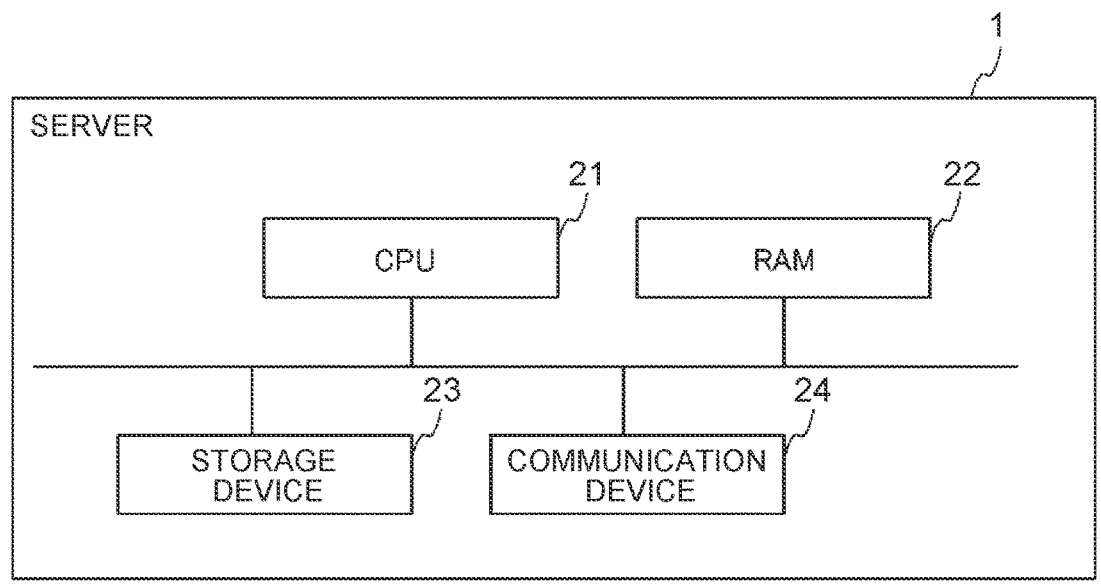
FIG. 2 is a block diagram showing a schematic configuration of a server shown in FIG. 1.
Figure 3:
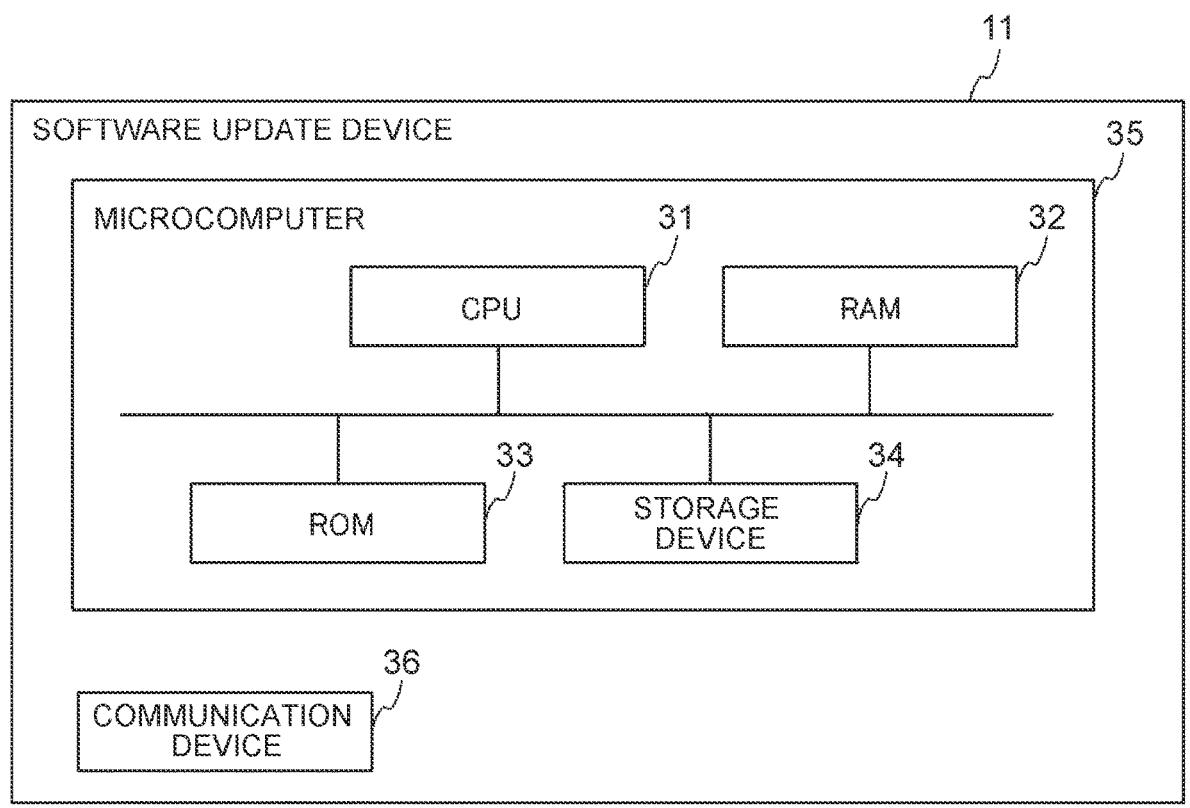
FIG. 3 is a block diagram showing a schematic configuration of a software update device shown in FIG. 1.

FIG. 1 is a block diagram showing an overall configuration of a network system according to embodiments. FIG. 2 is a block diagram showing a schematic configuration of a server shown in FIG. 1. FIG. 3 is a block diagram showing a schematic configuration of a software update device shown in FIG. 1.

The network system shown in FIG. 1 is a system for updating software of electronic control units 13a to 13d mounted on a vehicle, and includes a server 1 (center) and an in-vehicle network 2 mounted on the vehicle.

The server 1 is communicable with a software update device 11 mounted on the vehicle via a network 5, and manages software updates of the electronic control units 13a to 13d mounted on the vehicle.

As shown in FIG. 2, the server 1 includes a central processing unit (CPU) 21, a random access memory (RAM) 22, a storage device 23, and a communication device 24. The server 1 may include a plurality of the CPUs 21. The server 1 may include a plurality of the RAMS 22. The server 1 may include a plurality of the storage devices 23. Further, the server 1 may include a plurality of the communication devices 24. The storage device 23 includes a readable and writable storage medium such as a hard disk or a solid state drive (SSD), and stores a program for executing software update management, information used for update management, and update data of the electronic control unit. On the server 1, the CPU 21 executes a control process to be described later by executing the program read from the storage device 23 using the RAM 22 as a work area. The communication device 24 is a device that communicates with the software update device 11 via a network.

The in-vehicle network 2 includes the software update device 11 (over-the-air (OTA) master), a communication module 12, the electronic control units 13a to 13d, and a display device 14. The software update device 11 is connected to the communication module 12 via a bus 15a, is connected to the electronic control units 13a, 13b via a bus 15b, is connected to the electronic control units 13c, 13d via a bus 15c, and is connected to the display device 14 via a bus 15d. The software update device 11 is communicable with the server 1 wirelessly via the communication module 12. The software update device 11 controls the software update of the update-target electronic control unit (target ECU), among the electronic control units 13a to 13d, based on the update data acquired from the server 1. The software update device 11 may also be referred to as a central gateway. The communication module 12 is a communication device that connects the in-vehicle network 2 and the server 1. The electronic control units 13a to 13d control an operation of each component of the vehicle. The display device 14 (human machine interface (HMI)) is used to display various indications such as an indication that there is update data, an indication of an approval request screen for obtaining an approval on the software update from a user or an administrator, an indication of update results, and the like, when an update process of the software of the electronic control units 13a to 13d is performed. As the display device 14, a display device of a car navigation system can be typically used. However, the display device 14 is not particularly limited as long as the display device 14 can display information necessary for an update process of a program. Although four electronic control units 13a to 13d are illustrated in FIG. 1, the number of electronic control units is not particularly limited. In addition, another electronic control unit may be further connected to the bus 15d shown in FIG. 1, besides the display device 14.

The electronic control units 13a to 13d each include a CPU, a RAM, a non-volatile memory (storage), and a communication device. The electronic control units 13a to 13d may each include a plurality of CPUs. The electronic control units 13a to 13d may each include a plurality of RAMs. The electronic control units 13a to 13d may each include a plurality of non-volatile memories. Further, the electronic control units 13a to 13d may each include a plurality of communication devices. The CPU realizes functions of each electronic control unit by executing software (program) read from the non-volatile memory using the RAM as a work area. Here, the electronic control unit includes one having one data storage area (bank) for storing software and one having two data storage areas (banks) for storing software. In the data storage area of the electronic control unit, version information, parameter data, a boot program for boating, a program for software update, etc. may be stored, in addition to software for realizing the functions of the electronic control unit. In the electronic control unit having one data storage area, the software of the electronic control unit is affected as the update data is installed in the data storage area. On the other hand, in the electronic control unit having two data storage areas, one of the two data storage areas is set as a storage area (operational side) to be read, and the software stored in the storage area to be read is executed. The update data can be written in the background to the other storage area (non-operational side) that is not the storage area to be read during execution of the program in the storage area (operational side) to be read. When the activation is performed in the software update process, the updated version of the software can be activated as the storage area from which the CPU 41 reads the program is switched.

In the present disclosure, the electronic control unit having two data storage areas includes an electronic control unit that is provided with a memory called "one-side suspend memory" in which the one-side data storage area of the non-volatile memory is divided into two sides in a pseudo manner and a program can be written on one of the two sides of the data storage area while the program stored in the other side is being executed, and an electronic control unit that is provided with an extended non-volatile memory having a one-side data storage area in addition to a non-volatile memory having one-side data storage area and in which these two non-volatile memories can be used as the operational side and the non-operational side.

As shown in FIG. 3, the software update device 11 includes a microcomputer 35 and a communication device 36. The microcomputer 35 includes a CPU 31, a RAM 32, a ROM 33, and a storage device (storage) 34, The software update device 11 may include a plurality of CPUs. The software update device 11 may include a plurality of RAMs. The software update device 11 may include a plurality of ROMs. The software update device 11 may include a plurality of storage devices. In the software update device 11, the CPU 31 of the microcomputer 35 executes a control process described later by executing the program read from the ROM 33 or the storage device 34 using the RAM 32 as a work area. The communication device 36 is a device that communicates with the communication module 12, the electronic control units 13a to 13d, and the display device 14 via the buses 15a to 15d shown in FIG. 1.

Here, the software update process involves a phase of downloading the update data from the server 1, a phase of transferring the downloaded update data to the update-target electronic control unit and installing the update data in the storage area of the update-target electronic control unit, and a phase of activation in which the updated version of the software installed in the update-target electronic control unit is activated.

Downloading is a process of receiving the update data for updating the software of the electronic control unit from the server 1 and storing the received update data. The downloading phase includes, besides receiving the update data, control of a series of processes related to downloading, such as determination as to whether downloading can be performed and verification of the update data. Installation is a process of writing an updated version of the program (update software) in the storage unit of the update-target electronic control unit based on the downloaded update data. The installation phase includes, in addition to execution of installation, control of a series of processes related to installation, such as determination as to whether installation can be performed, transfer of the update data, and verification of the updated version of the program. Activation is a process of activating the installed updated version of the program. The activation control includes, in addition to execution of activation, control of a series of processes related to activation, such as determination as to whether the activation can be performed and verification of the execution results.

The update data transmitted from the server 1 to the software update device 11 may include any of the update software of the electronic control unit, the compressed data obtained by compressing the update software, and the divided data obtained by dividing the update software or the compressed data. Further, the update data may include an identifier for identifying the update-target electronic control unit (ECU ID) and an identifier for identifying the software before update (ECU software ID). The update data is downloaded as the distribution package described above, and the distribution package contains the update data of one or more electronic control units.

When the update data includes the update software itself, the software update device 11 transfers the update data (update software) to the update-target electronic control unit during the installation phase. When the update data includes compressed data, difference data, or divided data of the update software, the software update device 11 may transfer the update data to the update-target electronic control unit and the update-target electronic control unit may generate the update software from the update data. Alternatively, the software update device 11 may transfer the update software to the update-target electronic control unit after generating the update software from the update data. Here, the update software can be generated by decompressing the compressed data and assembling the difference data or the divided data.

The update software can be installed by the update-target electronic control unit based on the installation request from the software update device 11. Alternatively, the update-target electronic control unit that has received the update data may autonomously perform installation without receiving an explicit instruction from the software update device 11.

The update software can be activated by the update-target electronic control unit based on the activation request from the software update device 11. Alternatively, the update-target electronic control unit that has received the update data may autonomously perform activation without receiving an explicit instruction from the software update device 11.

The software update process can be performed continuously or in parallel for each of the electronic control units.

Further, the "software update process" in the present specification includes not only a process of continuously performing all of the downloading, installation, and activation, but also a process of performing only a part of the downloading, installation, and activation.

First Embodiment

Figure 4:
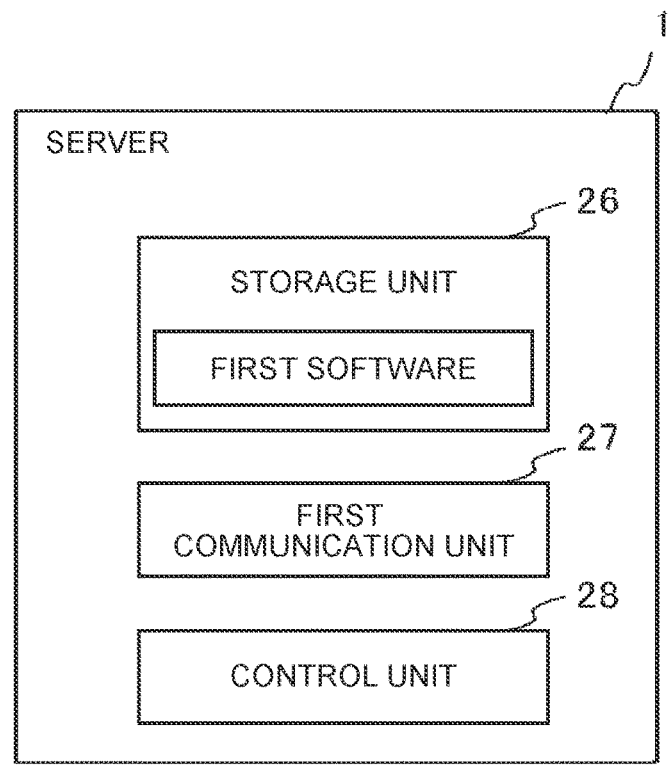
FIG. 4 is a functional block diagram of a server according to a first embodiment.

FIG. 4 is a functional block diagram of a server according to a first embodiment.

The server 1 includes a storage unit 26, a first communication unit 27, and a control unit 28.

The storage unit 26 stores first software for OTA, update management information used for managing the software update of the electronic control unit, and update data of the software of the electronic control unit. The storage unit 26 is realized by the storage device 23 shown in FIG. 2. The first software is server-side software (program) that can be executed by the CPU 21 shown in FIG. 2. The first software is software that wirelessly communicates with the software update device 11 mounted on the vehicle, and realizes a function of distributing the update data of the software of the electronic control unit via wireless communication. When the CPU 21 shown in FIG. 2 executes the first software, a first communication unit 27 and a control unit 28, which will be described later, are realized.

The update management information stored in the storage unit 26 is information in which each vehicle identification information (vehicle ID) that identifies the vehicle is associated with information indicating software that is available by one or more electronic control units mounted on the vehicle. A combination of the latest version information of the software of each of the electronic control units is defined as, for example, the information indicating the available software for the electronic control unit. The update management information and the update data are stored in the storage unit 26 when the software update campaign of the electronic control unit is registered.

The first communication unit 27 can receive a software update confirmation request from the software update device 11. The update confirmation request is, for example, information transmitted from the software update device 11 to the server 1 when power supply or ignition is turned on in the vehicle, and is information for requesting the server 1 to confirm whether there is update data of the electronic control unit. The first communication unit 27 transmits the information indicating whether there is update data to the software update device 11 in response to the update confirmation request received from the software update device 11. Further, the first communication unit 27 can receive a transmission request (download request) of a distribution package from the software update device 11. When the first communication unit 27 receives the download request for the distribution package, the first communication unit 27 transmits the distribution package including the software update data of the electronic control unit to the software update device 11.

When the first communication unit 27 receives the update confirmation request, the control unit 28 determines whether there is update data of the software of the vehicle specified by the vehicle ID included in the update confirmation request, based on the update management information stored in the storage unit 26. The first communication unit 27 transmits the determination result by the control unit 28 indicating whether there is update data to the software update device 11. When the control unit 28 determines that there is update data of the electronic control unit and receives the download request for the distribution package from the software update device 11, the control unit 28 generates the distribution package including the update data stored in the storage unit 26. The distribution package is transmitted to the software update device 11 by the first communication unit 27.

Figure 5:
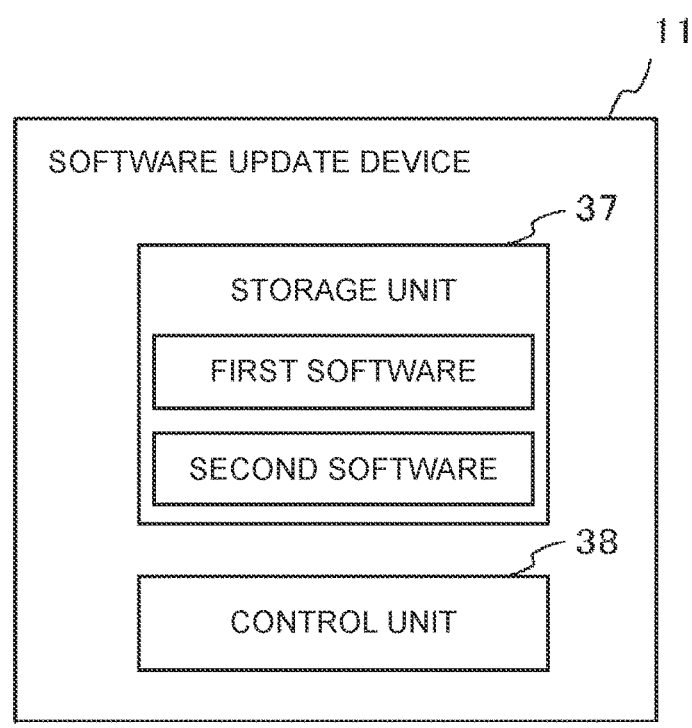
FIG. 5 is a functional block diagram of a software update device according to the first embodiment.

FIG. 5 is a functional block diagram of the software update device shown in FIG. 1.

The software update device 11 includes a storage unit 37 and a control unit 38. The storage unit 37 is realized by the storage device 34 shown in FIG. 3. The control unit 38 is realized in a manner such that the CPU 31 shown in FIG. 3 executes a program (program for controlling the software update device 11) stored in the ROM 33 using the RAM 32.

The storage unit 37 stores the first software for OTA and second software for OTA. The storage unit 26 is realized by the storage device 34 shown in FIG. 3. The first software and the second software are both client-side software (programs) that can be executed by the CPU 31 shown in FIG. 3. The first software and the second software are software that realizes functions of wirelessly communicating with the server 1 and downloading the update data of the software of the electronic control unit via wireless communication. The first software and the second software have common functions of downloading the update data and its accompanying functions (e.g. a function of confirming with the server 1 whether there is update data, a function of notifying the server 1 of completion of downloading, and a function of transmitting error information to the server 1 when an error occurs). However, the first software and the second software differ in specific processes for realizing the functions above and a communication procedure with the server-side software. Differences in the specific processes and communication procedure, etc. between the first software and the second software may occur due to differences in vendors and versions of the first software and the second software. The combination of the server-side OTA software and the client-side OTA software that can realize the download function of the update data is determined, and the first software and the second software are each executed in a corresponding combination with the server-side software.

The storage unit 37 stores the program for executing the software update of the electronic control units 13a to 13d, various data to be used when the software update is executed, and the update data of the software downloaded from the server 1.

The control unit 38 performs various processes for controlling the software update of the electronic control unit. More specifically, the control unit 38 downloads the update data by executing the first software or the second software. The control unit 38 transmits an update confirmation request of the software to the server 1 in response to the power supply or the ignition of the vehicle being turned on, etc. The update confirmation request includes, for example, the vehicle ID for identifying the vehicle and software versions of the electronic control units 13a to 13d connected to the in-vehicle network 2. The vehicle ID and the software version of the electronic control units 13a to 13d are used for determining whether there is the update data of the software of the corresponding electronic control unit based on a comparison with the latest version of the software retained by the server 1 for each vehicle ID. Further, the control unit 38 receives a confirmation result indicating whether there is update data from the server 1 in response to the update confirmation request, and determines whether there is update data based on the confirmation result. When there is update data of the software of any of the electronic control units, the control unit 38 transmits a download request for the distribution package to the server 1 and receives the distribution package transmitted from the server 1. In addition to the update data, the distribution package may include verification data for verifying the authenticity of the update data, the number and installation order of update data, various types of control information used at the time of software update, and the like. When the control unit 38 receives the distribution package including the update data from the server 1, the control unit 38 verifies the authenticity of the received distribution package.

Further, when the distribution package including the update data is downloaded, the control unit 38 performs the installation process, the activation process, and an approval request process at the time of executing the installation or the activation process of the update data. As the approval request process, the control unit 38 performs a process of causing an output device to output a notification indicating that an approval on the software update is required and a notification encouraging an input indicating that the software update is approved, and a process of receiving an operation input from the user. As the output device, the display device 14 provided in the in-vehicle network 2 or a voice output device that performs a voice notification, for example, may be used. For example, when the display device 14 is used as an output device in the approval request process, the control unit 38 causes the display device 14 to display the approval request screen for requesting an approval on the software update, and causes the display device 14 to display a notification encouraging the user or the administrator to perform a predetermined input operation, such as pressing an approval button, when the user or the administrator approves the software update. Further, in the approval request process, the control unit 38 causes the display device 14 to display a text or an icon notifying that there is update data of the software of the electronic control unit or causes the display device 14 to display restrictions during execution of the software update process, for example.

Figure 6A:
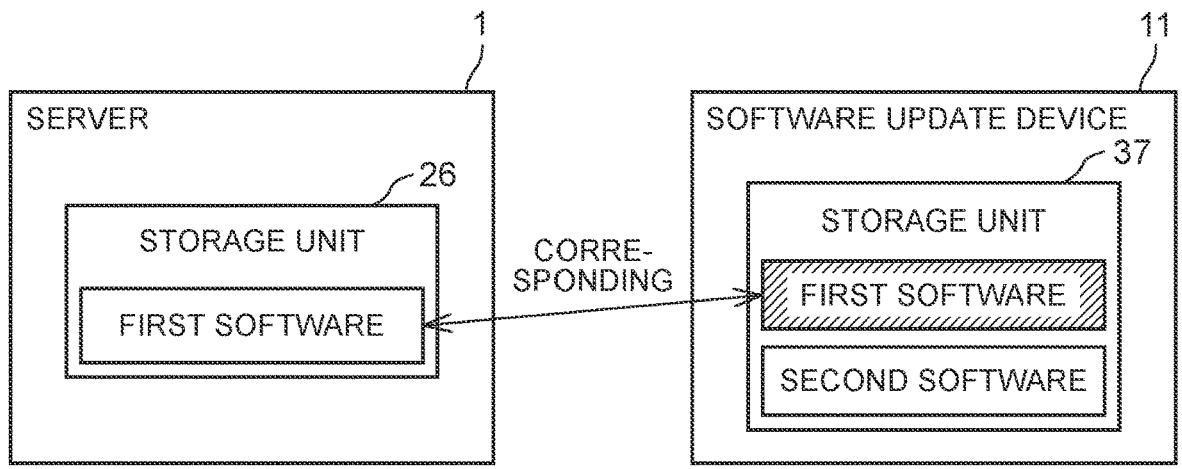
FIG. 6A is a schematic diagram showing an outline of software switching according to the first embodiment.
Figure 6B:
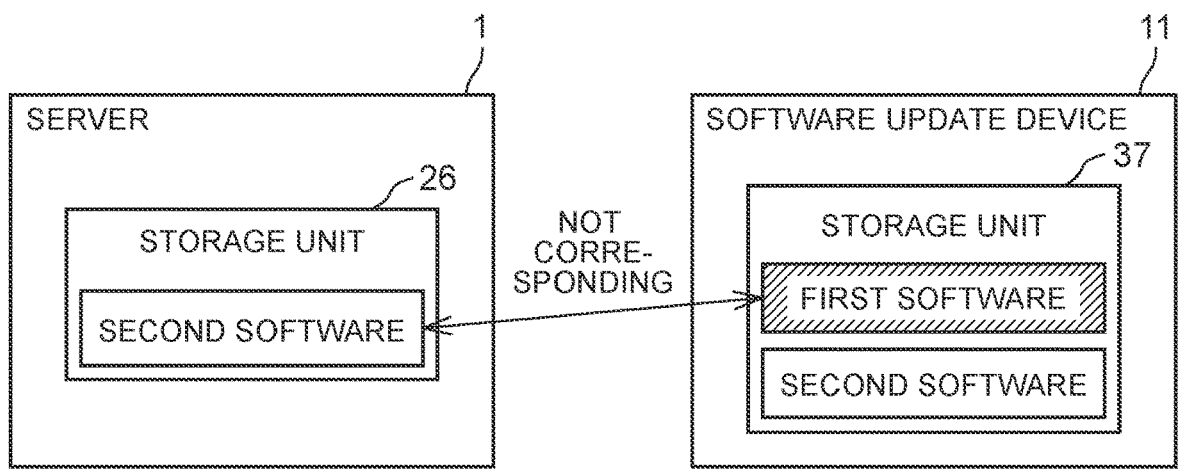
FIG. 6B is a schematic diagram showing the outline of software switching according to the first embodiment.
Figure 6C:
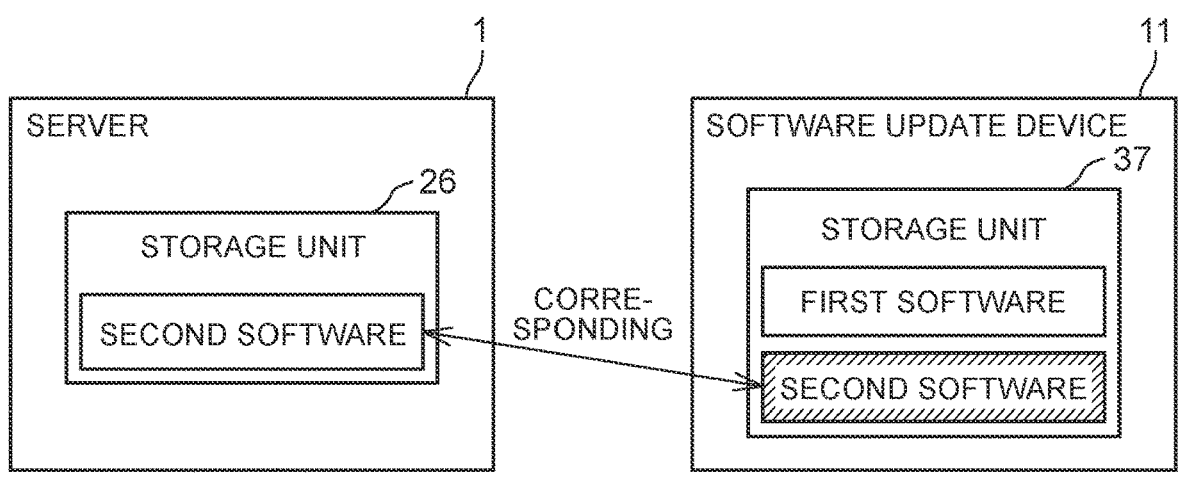
FIG. 6C is a schematic diagram showing the outline of software switching according to the first embodiment.

FIGS. 6A to 6C are schematic views showing an outline of software switching according to the first embodiment. The following description assumes that the update data can be downloaded in combination of the server-side first software and the client-side first software and in combination of the server-side second software and the client-side second software, and the update data cannot be downloaded in other combinations than the combinations above.

First, as shown in FIG. 6A, a case in which the first software operates as the OTA software on the server 1 is assumed. The first software used by default and the second software as spare software are installed as the client-side OTA software in the storage unit 37 of the software update device 11. The first software executed by default in the software update device 11 corresponds to the first software operating on the server 1. Therefore, in this case, the control unit 38 can issue the confirmation request of the update data to the server 1 and download the update data from the server 1 by executing the first software.

Next, as shown in FIG. 6B, a case where the OTA software operating on the server 1 is changed to the second software is assumed. As an example of the server-side second software, for example, software that is developed by a vendor different from a vendor developing the first software and incompatible with the first software can be considered. As another example of the second software, for example, the software that is developed by the same vendor as the vendor developing the first software, but that loses compatibility with the first software at least partially as a result that the software is updated in response to a change in the type of server operation system (OS) or a version upgrade can be considered.

The first software executed by default in the software update device 11 does not correspond to the second software operating on the server 1. Therefore, in this case, the control unit 38 cannot issue the confirmation request of the update to the server 1 and cannot download the update data from the server 1 by executing the first software.

In this case, as shown in FIG. 6C, the control unit 38 switches the software to be executed from the first software as the default software to the second software as the spare software. The second software after switching corresponds to the second software operating on the server 1. Therefore, in this case, the control unit 38 can issue the confirmation request of the update data to the server 1 and can download the update data from the server 1 by executing the second software.

FIG. 7 is a flowchart showing an example of the control processes executed by the server according to the first embodiment. The control process shown in FIG. 7 is repeatedly executed, for example, at predetermined time intervals.

In step S1, the first communication unit 27 determines whether the update confirmation request has been received from the software update device 11. When the determination in step S1 is YES, the process proceeds to step S2; otherwise, the process proceeds to step S3.

In step S2, the first communication unit 27 transmits information indicating whether there is update data of the software of the electronic control unit to the vehicle that has transmitted the update confirmation request. Regarding whether there is update data, a determination that there is update data can be made, for example, when the control unit 28 compares the combination of software versions associated with the vehicle ID included in the update confirmation request and stored in the update management information, with the combination of the current software versions included in the update confirmation request, and the combination of the current software versions included in the update confirmation request is older than the combination of the versions stored in the update management information. After that, the process proceeds to step S3.

In step S3, the first communication unit 27 determines whether the download request for the update data (distribution package) has been received from the software update device 11. When the determination in step S3 is YES, the process proceeds to step S4; otherwise, the process proceeds to step S1.

In step S4, the first communication unit 27 transmits, to the software update device 11, the distribution package that includes the update data of software and is generated by the control unit 28. After that, the process proceeds to step S1.

Figure 8:
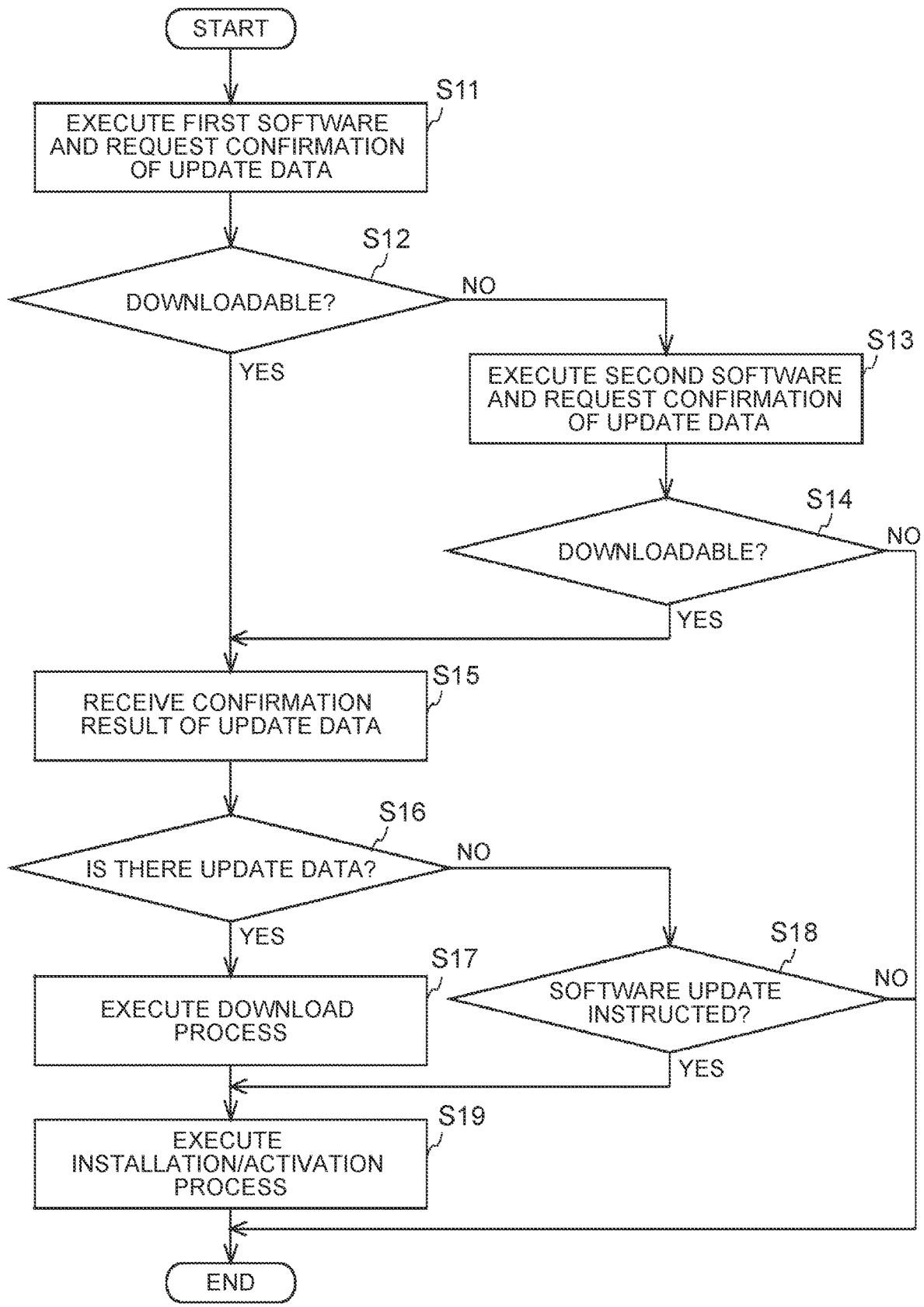
FIG. 8 is a flowchart showing an example of the control process executed by the software update device according to the first embodiment.

FIG. 8 is a flowchart showing an example of the control process executed by the software update device according to the first embodiment. The control process shown in FIG. 8 is executed, for example, when power supply or ignition of the vehicle is turned on.

In step S11, the control unit 38 executes the first software for OTA and requests the server 1 to confirm whether there is update data of the software of the electronic control unit. The first software is software executed by the control unit 38 by default, and corresponds to the OTA software that operates on the server 1 when the function of updating software with OTA is added to the vehicle at the time of manufacturing or after the vehicle is sold. The control unit 38 transmits the update confirmation request including a combination of the vehicle ID and the software version of the electronic control unit to the server 1 so as to confirm whether there is update data. After that, the process proceeds to step S12.

In step S12, the control unit 38 determines whether a state is a state where the data is downloadable from the server 1. The state where the data is downloadable means a state where the control unit 38 can transmit and receive messages and data via communication with the OTA software operating on the server 1 in accordance with the procedure determined for the OTA software, and the update data can be downloaded from the server 1 using a function of software that is being executed. The control unit 38 may determine that the state is not the state where the data is downloadable when the control unit 38 detects at least one of an event in which a link with the server 1 cannot be established, an event in which timeout occurs in communication with the server 1, and an event in which an error occurs with the OTA software. When the determination in step S12 is YES, the process proceeds to step S15; otherwise, the process proceeds to step S13.

In step S13, the control unit 38 executes the second software for OTA, and requests the server 1 to confirm whether there is update data of the software of the electronic control unit. The second software is spare software that is installed at the time of manufacturing of the vehicle or after the vehicle is sold. However, the second software does not support (in other words, the second software is not compatible with) the OTA software that operates on the server 1 at the timing when the second software is installed. The control unit 38 transmits the update confirmation request including a combination of the vehicle ID and the software version of the electronic control unit to the server 1 so as to confirm whether there is update data. After that, the process proceeds to step S14. In step S13, the control unit 38 may terminate the first software before executing the second software.

In step S14, the control unit 38 determines whether the state is the state where the data is downloadable from the server 1. The determination process in step S14 is the same as the determination process in step S12. When the determination in step S14 is YES, the process proceeds to step S15; otherwise, the process ends. When NO is determined in step S14, there is no software corresponding to the OTA software operating on the server 1, and the software cannot be updated via the OTA. Therefore, an error notification or a notification encouraging the user to receive servicing at a dealer or a maintenance shop, etc. may be issued.

In step S15, the control unit 38 receives the confirmation result in response to the update confirmation request from the server 1. After that, the process proceeds to step S16.

In step S16, the control unit 38 determines whether there is update data of software of any of the electronic control units 13a to 13d based on the confirmation result received in step S15. When the determination in step S16 is YES, the process proceeds to step S17; otherwise, the process proceeds to step S18.

In step S17, the control unit 38 executes the download process using the function of the OTA software. More specifically, the control unit 38 transmits a download request for the distribution package to the server 1, receives the distribution package transmitted in response to the download request, and stores the received distribution package in the storage unit 37. The control unit 38 verifies the authenticity of the update data included in the received distribution package. In step S17, the control unit 38 may determine whether the download can be performed, and may notify the server 1 of completion of downloading. After that, the process proceeds to step S19.

In step S18, the control unit 38 determines whether the instruction to execute the software update process has been received. The software update process is not always executed continuously. For example, there may be a case where the software update process is suspended at the time point when the download is completed or the installation is completed, and the subsequent update process is executed later. Therefore, in the present embodiment, when the control unit 38 determines in step S16 that there is no update data, the software update process that has been suspended can be resumed by providing a determination in step S18. The determination in step S18 can be made based on, for example, whether a predetermined operation input is received using the input button, etc., after the text or the icon notifying that the software update process has been suspended is displayed on the display device 14. When the determination in step S18 is YES, the process proceeds to step S19; otherwise, the process ends.

In step S19, the control unit 38 executes the installation process and the activation process for the update-target electronic control unit (target ECU). More specifically, the control unit 38 transfers the update data to the update-target electronic control unit and instructs the installation. The update-target electronic control unit writes the update data received from the software update device 11 to the data storage area. Next, the control unit 38 instructs the update-target electronic control unit to activate the updated version of the software. The update-target electronic control unit is restarted when a specific operation such as turning off of power supply or ignition is performed, and executes the updated software. Thus, the software update (function update) of the electronic control unit is completed. After the installation process or the activation process is completed, the process shown in FIG. 8 is completed.

When the update-target electronic control unit has a configuration having one data storage area, the software of the electronic control unit is affected upon installation of the update data in the data storage area. Therefore, the installation process and the activation process may be performed continuously. Further, in this case, when the update-target electronic control unit has one data storage area, the approval request process for the installation and the activation may be performed before the installation is executed, and the approval request process before the activation may be omitted.

Further, the control unit 38 may execute the process of determining whether the installation can be executed and the approval request process for installation before the installation is executed. As the approval request process for installation, for example, the control unit 38 causes the display device 14 to display an indication to start the software update of the electronic control unit, an indication to request the approval of the user for the software update, and if necessary, an indication of the time required to install the update data and restrictions and precautions during installation, and receives an operation input by the user using an input device such as a touch panel and an operation button. Subsequently, the control unit 38 determines whether the operation input of approving the software update (installation) has been performed. The operation input of approving the installation can be determined based on, for example, whether a button "approve" or "start update", etc. displayed on the display device 14 is pressed. When the user does not immediately approve the start of software update (installation) and desires to start the software update (installation) later, such an intention can be received when a button "later" etc. is pressed.

Similarly, before the activation is executed, the control unit 38 may execute the process of determining whether the activation can be executed and the process of executing the approval request process for the activation. As the approval request process for installation, for example, the control unit 38 causes the display device 14 to display an indication that the software update of the electronic control unit is ready and the program is updated by a specific operation such as turning off of power supply or ignition, and if necessary, an indication of the time required for activation and restrictions and precautions during activation, and receives an operation input by the user using the input device such as a touch panel and an operation button. Next, the control unit 38 determines whether the operation input of approving the software update (activation) has been performed. The operation input of approving the activation can be determined based on, for example, whether a button "approve" or "update", etc. displayed on the display device 14 is pressed. Further, when the user does not immediately approve the software update (activation) and desires to perform the software update later, such an intention can be received when a button "later" etc. is pressed.

The software update device 11 according to the present embodiment has first software and second software, which are different from each other, in the storage unit 37 as the OTA software, and downloads the update data from the server 1 by executing either software. Therefore, the software update device 11 according to the present embodiment can correspond to each of the server on which the server-side software corresponding to the first software operates and the server on which the server-side software corresponding to the second software operates.

In addition, a case in which, during a lifecycle of the vehicle, the OTA software operating on the server 1 is changed and thus loses a compatibility with the software that initially operates on the server 1 is assumed. When the software update device 11 according to the present embodiment executes the second software stored in the storage unit 37 when the update data cannot be downloaded using the function of the first software for OTA. With such a configuration, when the update data cannot be received using the first software, the update data can be downloaded by switching the software to be executed to the second software.

Second Embodiment

Figure 9:
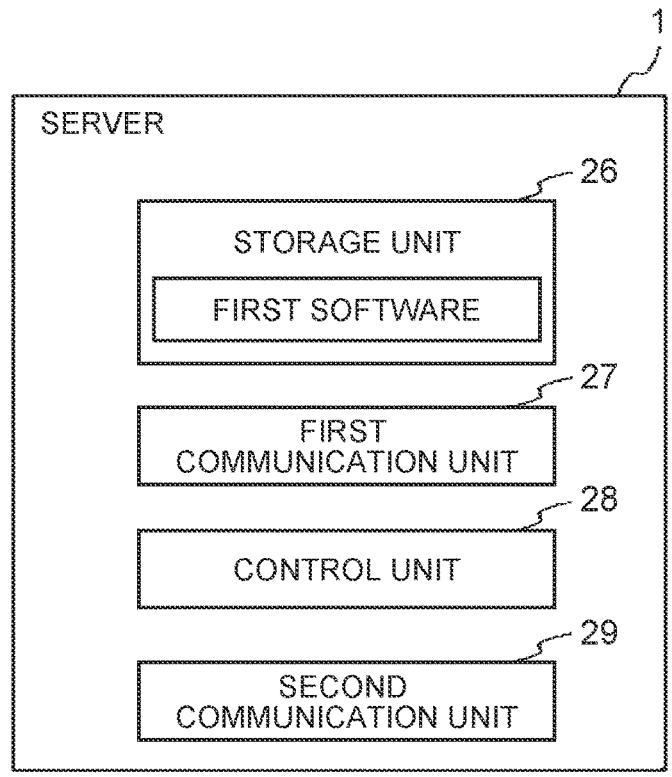
FIG. 9 is a functional block diagram of a server according to a second embodiment.

FIG. 9 is a functional block diagram of a server according to a second embodiment.

The server 1 according to the second embodiment has a configuration in which a second communication unit 29 is added to the configuration according to the first embodiment. The second communication unit 29 communicates with the software update device without using the OTA software. Specifically, the second communication unit 29 can receive a transmission request of the software information from the software update device 11, and transmits the software information to the software update device 11 in response to the transmission request. The software information is information that identifies the OTA software used for distribution of update data on the server 1. Further, the second communication unit 29 can receive the transmission request of the OTA software from the software update device 11, and transmits the client-side software corresponding to the OTA software operating on the server 1 to the software update device 11 in response to the transmission request.

Figure 10:
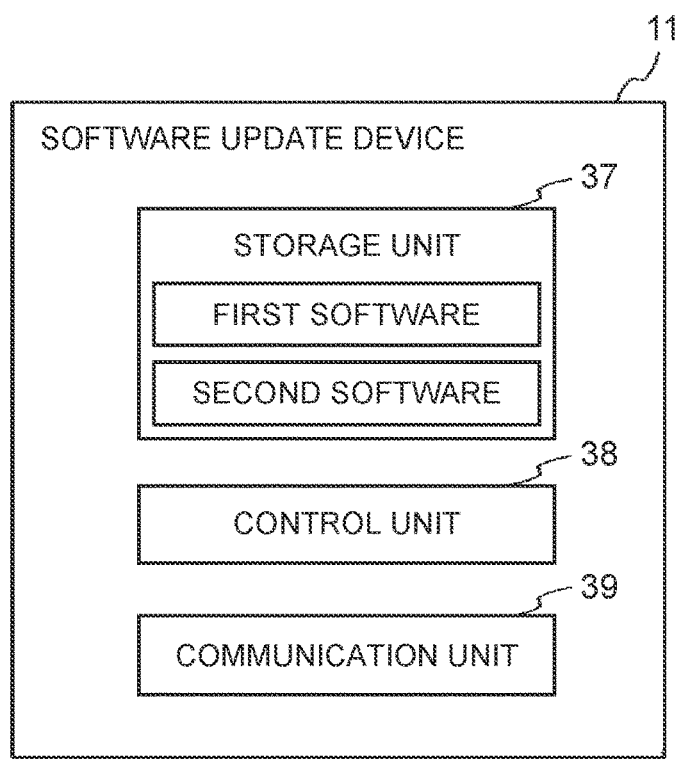
FIG. 10 is a functional block diagram of a software update device according to the second embodiment.

FIG. 10 is a functional block diagram of a software update device according to a second embodiment.

The software update device 11 according to the second embodiment has a configuration in which a communication unit 39 is added to the configuration according to the first embodiment. The communication unit 39 can communicate with the second communication unit 29 of the server without using the OTA software. The communication unit 39 transmits the transmission request of the software information above to the server 1, and receives the software information transmitted from the server 1 in response to the transmission request. The received software information is information to which the control unit 38 refers for determining whether the software corresponding to the OTA software operating on the server 1 is stored in the storage unit 37. When the control unit 38 determines that the software corresponding to the OTA software operating on the server 1 is not stored in the storage unit 37, the communication unit 39 requests the server 1 to transmit the software corresponding to the OTA software operating on the server 1 and downloads the software. The communication unit 39 stores the downloaded new OTA software in the storage unit 37.

Figure 11A:
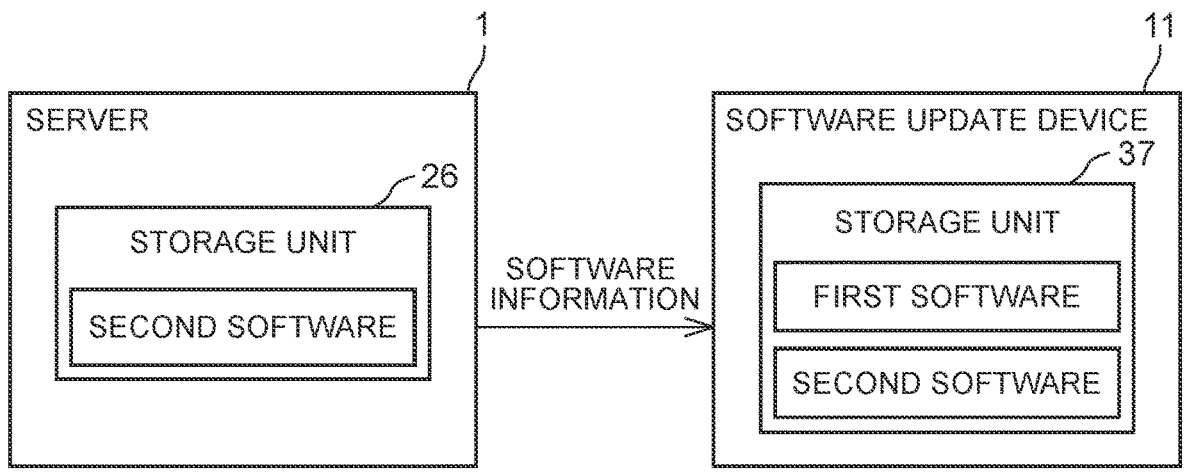
FIG. 11A is a schematic diagram showing an outline of software selection according to the second embodiment.
Figure 11B:
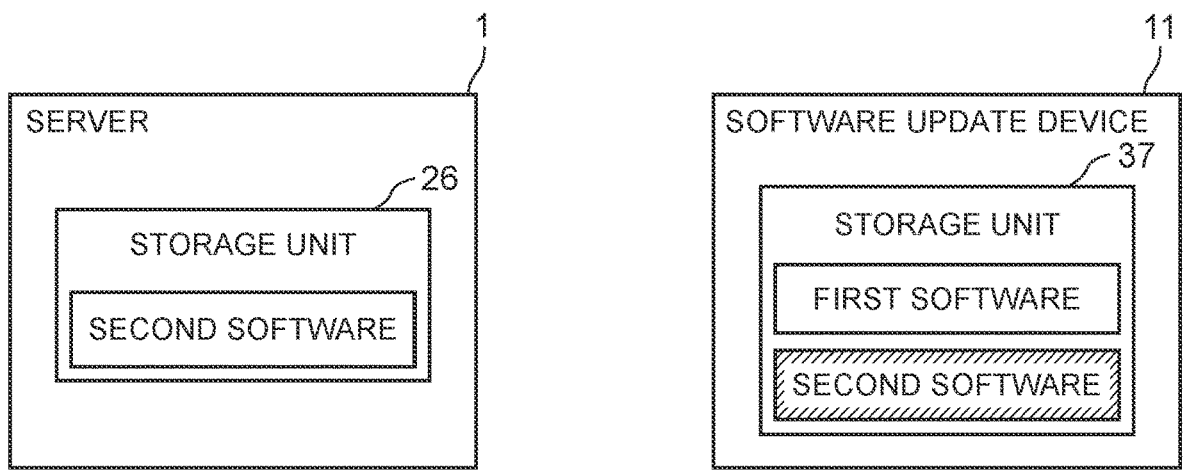
FIG. 11B is a schematic diagram showing the outline of software selection according to the second embodiment.

FIGS. 11A and 11B are schematic diagrams illustrating an outline of software selection according to the second embodiment.

A case in which the second software is operating as the OTA software on the server 1 is assumed. The first software and the second software are installed in the storage unit 37 of the software update device 11 as the client-side OTA software.

First, as shown in FIG. 11A, the communication unit 39 of the software update device 11 receives software information from the server 1. Next, as shown in FIG. 11B, the control unit 38 executes the client-side second software corresponding to the server-side second software specified by the received software information. As described above, when the software corresponding to the server-side software specified based on the software information received from the server 1 is stored in the storage unit 37, the control unit 38 selects appropriate software based on the software information received from the server 1. This makes it possible to issue the confirmation request of the update data to the server 1 and to download the update data from the server 1.

Figure 12A:
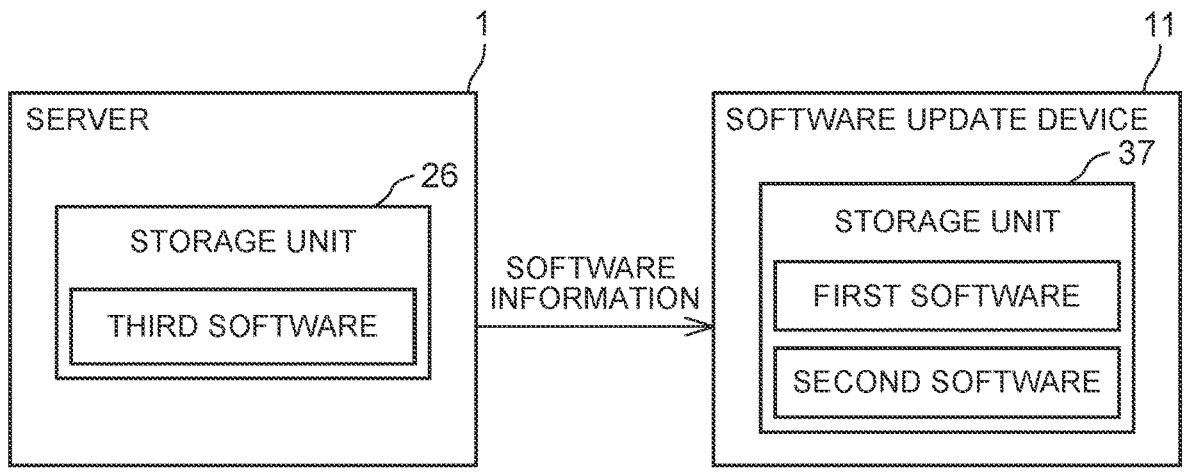
FIG. 12A is a schematic diagram showing an outline of software addition according to the second embodiment.
Figure 12B:
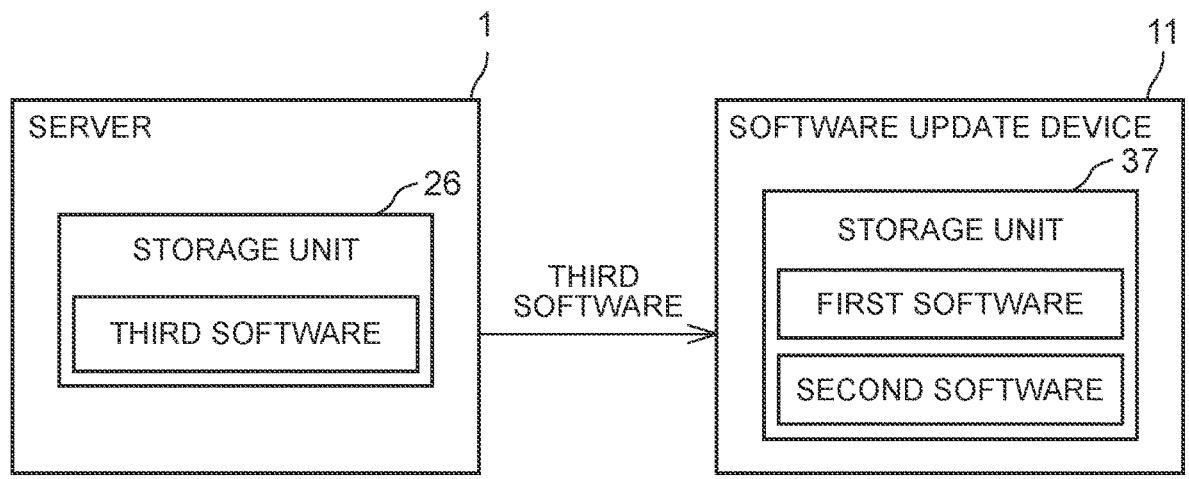
FIG. 12B is a schematic diagram showing the outline of software addition according to the second embodiment.
Figure 12C:
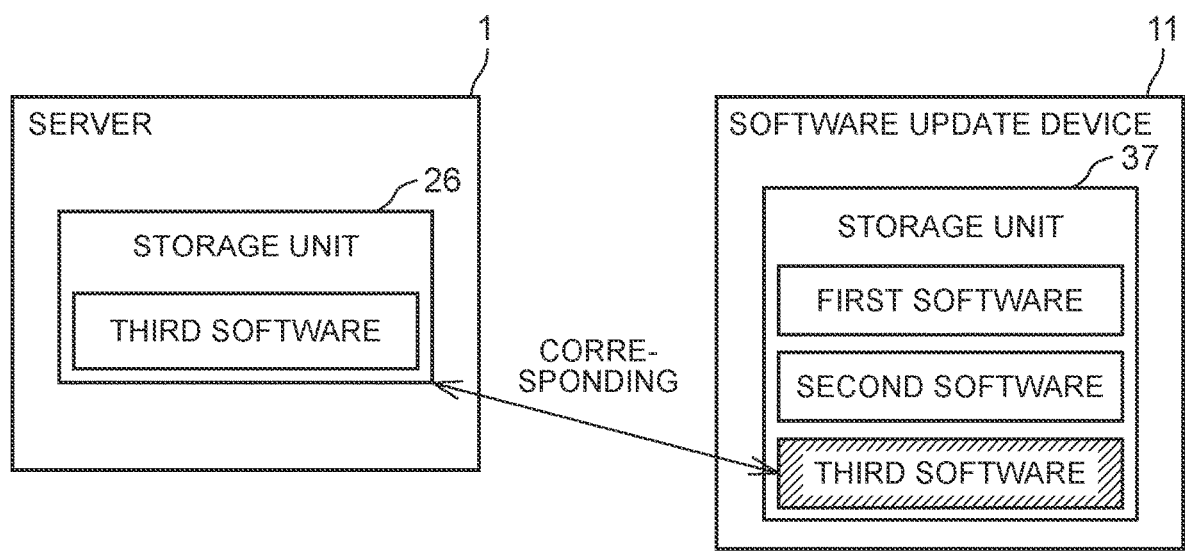
FIG. 12C is a schematic diagram showing the outline of software addition according to the second embodiment.

FIGS. 12A to 12C are schematic views showing an outline of software addition according to the second embodiment. Third software shown in FIGS. 12A to 12C are different from either of the first software and the second software. The update data can be downloaded in combination of server-side third software and client-side third software, and the update data cannot be downloaded in other combinations than the combination above.

A case in which the third software is operating as the OTA software on the server 1 is assumed. The first software and the second software are installed in the storage unit 37 of the software update device 11 as the client-side OTA software. The update data cannot be downloaded from the third software operating on the server 1 using either of the first software and the second software.

First, as shown in FIG. 12A, the communication unit 39 of the software update device 11 receives software information from the server 1. However, the software corresponding to the server-side third software specified based on the software information is not stored in the storage unit 37. Therefore, as shown in FIG. 12B, the communication unit 39 receives the client-side third software corresponding to the third software operating on the server 1. Then, as shown in FIG. 12C, the control unit 38 can issue a confirmation request of the update data to the server 1 or download of the update data from the server 1 by executing the received third software.

FIG. 13 is a flowchart showing an example of the control processes executed by the server according to the second embodiment. The server according to the second embodiment also executes the control process shown in FIG. 7. However, the repeated description will be omitted. The control process shown in FIG. 13 is repeatedly executed, for example, at predetermined time intervals in parallel with the control process shown in FIG. 7.

In step S5, the second communication unit 29 determines whether the transmission request of the software information has been received from the software update device 11. When the determination in step S5 is YES, the process proceeds to step S6; otherwise, the process proceeds to step S7.

In step S6, the second communication unit 29 transmits the software information to the vehicle that has transmitted the transmission request of the software information. After that, the process proceeds to step S7.

In step S7, the second communication unit 29 determines whether the transmission request of the OTA software (client side) has been received. When the determination in step S7 is YES, the process proceeds to step S8; otherwise, the process proceeds to step S5.

In step S8, the second communication unit 29 transmits the OTA software (client side) to the vehicle that has transmitted the transmission request of the OTA software. After that, the process proceeds to step S5.

Figure 14:
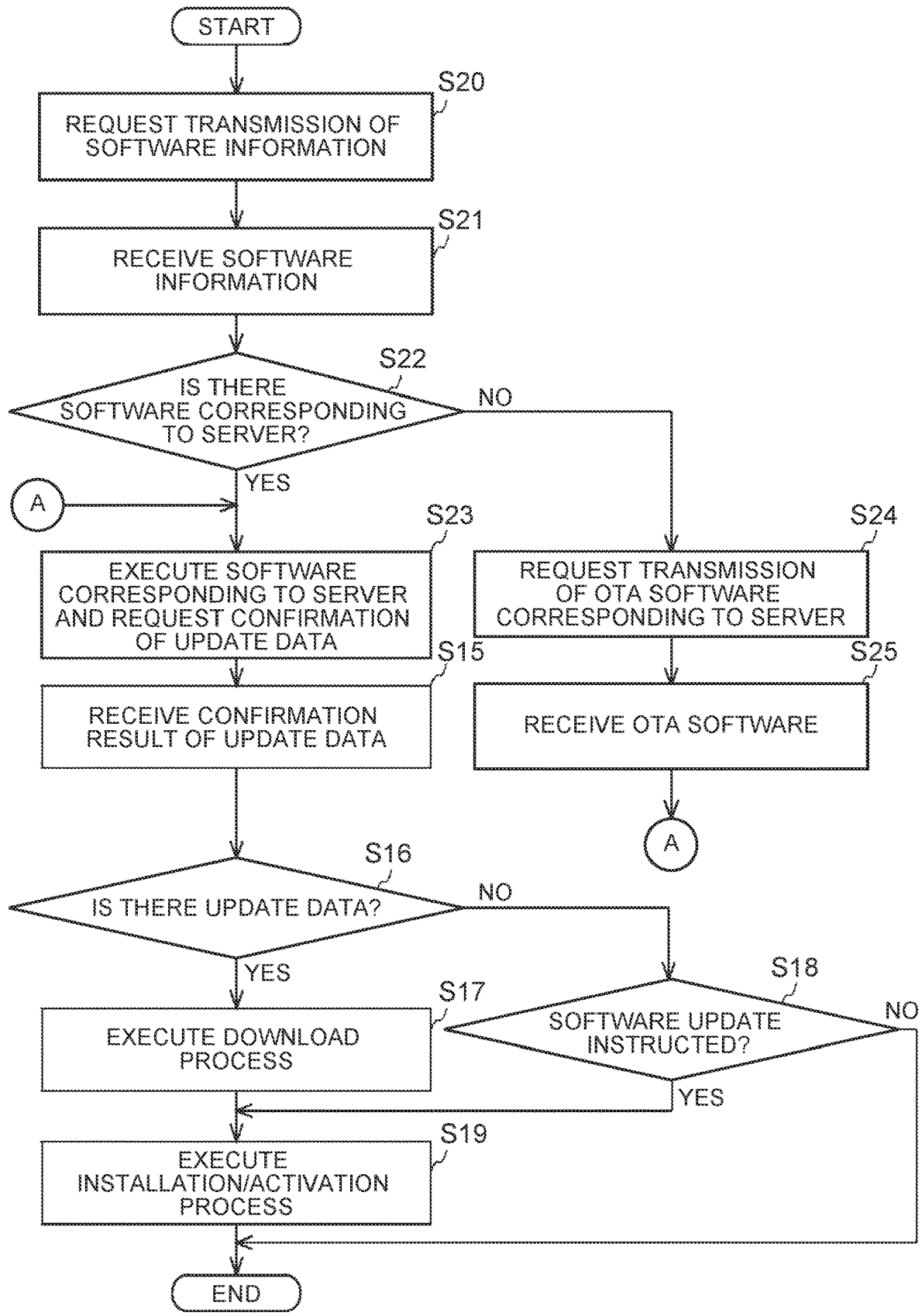
FIG. 14 is a flowchart showing an example of the control process executed by the software update device according to the second embodiment.

FIG. 14 is a flowchart showing an example of the control process executed by the software update device according to the second embodiment. The control process shown in FIG. 14 is executed, for example, in response to power supply or ignition of the vehicle being turned on.

In step S20, the communication unit 39 transmits the transmission request of the software information to the server 1. After that, the process proceeds to step S21.

In step S21, the communication unit 39 receives software information from the server 1. After that, the process proceeds to step S22.

In step S22, the control unit 38 determines whether the software corresponding to the server-side software specified based on the received software information is stored in the storage unit 37. When the determination in step S22 is YES, the process proceeds to step S23, otherwise, the process proceeds to step S24.

In step 23, the control unit 38 executes software corresponding to the server-side software specified based on the software information, and requests the server 1 to confirm whether there is update data of the software of the electronic control unit. After that, the process proceeds to step S15.

In step S24, the communication unit 39 transmits, to the server 1, a transmission request of the client-side software corresponding to the server-side software specified based on the software information. After that, the process proceeds to step S25.

In step S25, the communication unit 39 receives, from the server 1, the client-side software corresponding to the server-side software specified based on the software information, and stores the received software in the storage unit 37. Then, the process proceeds to step S23. When the communication unit 39 receives the OTA software from the server 1 in step S25, the control unit 38 executes the software received in step S25 in step 23.

The processes in steps S15 to S19 shown in FIG. 14 are the same as those described in FIG. 8. Therefore, the repeated description will be omitted.

Further, the transmission request and reception of software information in steps S20 and S21 and the transmission request and reception of the OTA software in steps S24 and S25 are processes that can be executed without using the OTA software.

The software update device 11 according to the second embodiment has the first software and the second software, which are different from each other, in the storage unit 37 as the OTA software, and selects the software corresponding to the server-side software based on the software information received from the server 1 and executes the selected software. Even when the OTA software operating on the server 1 is changed, the update data can be downloaded by executing the software corresponding to the server-side software.

Further, when there is no software corresponding to the server-side software, the software can be downloaded from the server 1. Therefore, the update data can be downloaded using the downloaded software.

In the second embodiment described above, the example in which the software information is the information for specifying the OTA software operating on the server 1 has been described. However, the software information may be information that specifies the OTA software that needs to be executed in the software update device 11.

In the second embodiment described above, an example in which the transmission request and reception of the software information and the transmission request and reception of the OTA software are performed without using the function of the OTA software stored in the storage unit 37 has been described. However, the procedure for the transmission request and reception of the software information and the transmission request and reception of the OTA software may be standardized, and the standardized procedure may be implemented in all types of OTA software (server-side OTA software and client-side OTA software).

Other Modifications

The function of the server 1 exemplified as the embodiments above can be realized as an update management method executed by a computer including a processor (CPU), a memory, and a storage device, an update management program executed by the computer, or a computer readable non-transitory storage medium that stores the update management program. Similarly, the function of the software update device 11 exemplified in the embodiments can be realized as an update control method executed by an in-vehicle computer including a processor (CPU), a memory, and a storage device, an update control program executed by the in-vehicle computer, or a computer readable non-transitory storage medium that stores the update control program.

In the above embodiment, an example in which the software update device 11 provided in the in-vehicle network controls the program update of all the electronic control units 13a to 13d as the master device. However, any one of the electronic control units 13a to 13d may have the update control function shown in FIG. 8 or FIG. 14 and control program updates of the other electronic control units, instead of providing the software update device 11. Further, instead of providing the software update device 11, the update control function shown in FIG. 8 or FIG. 14 can be provided in an external device that can be connected to the in-vehicle network 2 by wire so as to perform the program update process of the electronic control units 13a to 13d using the external device.

The disclosed technology can be used in a network system for updating program of an electronic control unit.

What is claimed is:

1. An update control method executed by a computer including a processor, a memory, and a storage device so as to control software update of an electronic control unit mounted on a vehicle, the update control method comprising:
   storing first download software that is download software used for downloading update data of the electronic control unit from a server, the server using server software; receiving software information that specifies the server software used by the server distributing the update data, from the server;
   downloading the update data by executing the first download software at a first time, in response to the server using, as the server software, first server software corresponding to the first download software as the server software; and
   at a second time, in response to the server using, as the server software, second server software corresponding to second download software as the server software, the second server software being different from the first server software, and the second download software being used for downloading the update data from the server and being different from the first download software,
      i) receiving the second download software from the server,
      ii) storing the second download software, and
      iii) downloading the update data by executing the second download software.

2. A software update device configured to control software update of an electronic control unit mounted on a vehicle, the software update device comprising:
   one or more processors configured to download update data of the electronic control unit from a server by using download software, the server using server software; and
   one or more storage devices configured to store first download software as the download software, wherein the one or more processors are configured to when downloading the update data, receive software information that specifies the server software used by the server distributing the update data, from the server, when the server uses, as the server software, first server software corresponding to the first download software, download the update data by executing the first download software, and when the server uses, as the server software, second server software corresponding to second download software, the second server software being different from the first server software, and the second download software being used for downloading the update data from the server and being different from the first download software,
   i) receive the second download software from the server,
   ii) store the second download software in the one or more storage devices, and
   iii) download the update data by executing the second download software.

3. The software update device according to claim 2, wherein the one or more processors are configured to:

determine, based on the software information, whether the download software corresponding to the server software used by the server is stored in the one or more storage devices, and receive the second download software from the server when the one or more processors determine that the download software corresponding to the server software used by the server is not stored in the one or more storage devices and the server uses the second server software as the server software.

4. A non-transitory computer readable storage medium storing an update control program that is executable by a computer and that causes the computer to perform functions so as to control software update of an electronic control unit mounted on a vehicle, the computer including a processor, a memory, and the non-transitory storage medium, the functions comprising:

storing first download software that is download software used for downloading update data of the electronic control unit from a server, the server using server software;

when downloading the update data, receiving software information that specifies the server software used by the server distributing the update data, from the server;

when the server uses, as the server software, first server software corresponding to the first download software, downloading the update data by executing the first download software; and when the server uses, as the server software, second server software corresponding to second download software, the second server software being different from the first server software, and the second download software being used for downloading the update data from the server and being different from the first download software,
   i) receiving the second download software from the server,
   ii) storing the second download software, and
   iii) downloading the update data by executing the second download software.

* * * * *